United States Patent [19]
Asami et al.

[11] Patent Number: 6,055,587
[45] Date of Patent: Apr. 25, 2000

[54] INTEGRATED CIRCUIT SCSI I/O CELL HAVING SIGNAL ASSERTION EDGE TRIGGERED TIMED GLITCH FILTER THAT DEFINES A STROBE MASKING PERIOD TO PROTECT THE CONTENTS OF DATA LATCHES

[75] Inventors: Takashi Asami, Mission Viejo; Aurelio Jesus Cruz, Aliso Viejo; Khanh Trong Vu, Irvine, all of Calif.

[73] Assignee: Adaptec, Inc,, Milpitas, Calif.

[21] Appl. No.: 09/049,365

[22] Filed: Mar. 27, 1998

[51] Int. Cl.⁷ ........................................ G06F 13/12
[52] U.S. Cl. .................. 710/49; 710/14; 710/25; 327/165; 327/331; 327/551
[58] Field of Search .................. 710/14, 38, 49, 710/58, 25; 365/189.05; 395/117; 327/165, 331, 551

[56] References Cited

U.S. PATENT DOCUMENTS

| | | | |
|---|---|---|---|
| 4,105,980 | 8/1978 | Cowardin et al. | 327/165 |
| 4,353,032 | 10/1982 | Taylor | 327/20 |
| 4,627,032 | 12/1986 | Kolwicz et al. | 365/203 |
| 5,113,098 | 5/1992 | Teymouri | 327/552 |
| 5,388,250 | 2/1995 | Lewis et al. | 710/58 |
| 5,483,625 | 1/1996 | Robertson et al. | 395/117 |
| 5,563,532 | 10/1996 | Wu et al. | 327/34 |
| 5,608,883 | 3/1997 | Kando et al. | 710/129 |
| 5,640,130 | 6/1997 | Ito et al. | 331/75 |
| 5,703,416 | 12/1997 | Hinkle et al. | 307/89 |
| 5,703,810 | 12/1997 | Nagy | 365/189.05 |
| 5,793,236 | 8/1998 | Kosco | 327/218 |
| 5,796,660 | 8/1998 | Toda | 365/189.05 |
| 6,003,095 | 12/1999 | Lee | 710/1 |

*Primary Examiner*—Thomas C. Lee
*Assistant Examiner*—Tammara Peyton
*Attorney, Agent, or Firm*—Christie, Parker & Hale, LLP

[57] ABSTRACT

An integrated circuit, configured for connection to an SCSI bus includes a strobe assertion edge triggered glitch filter. Input data latches are controlled by the strobe assertion edge gated with a strobe enable signal and the inverted and delayed Q output of a flip-flop. Once a valid strobe assertion edge is detected, it is used latch data bus signals into the data latches. Following a defined delay period through a delay stage, the data latch strobe is masked from any further transition until the strobe enable signal is again affirmatively asserted by an SR latch. The masking period is defined upon receipt of a valid strobe assertion edge and maintained for a first period by the combination of the SR latch, a flip-flop and a delay stage. The latch strobe mask is maintained for a second period by a strobe masking extension circuit made up of series-connected flip-flops. The strobe mask extension period is determined by a sampling or reference clock frequency which propagates a signal through the flip-flops to subsequently cause the SR latch to affirmatively assert a strobe enable signal just before the expected arrival of a next valid assertion edge of the strobe signal.

10 Claims, 3 Drawing Sheets

INTEGRATED CIRCUIT SCSI I/O CELL HAVING SIGNAL ASSERTION EDGE TRIGGERED TIMED GLITCH FILTER THAT DEFINES A STROBE MASKING PERIOD TO PROTECT THE CONTENTS OF DATA LATCHES

FIELD OF THE INVENTION

The present invention is directed, generally, to an improved input/output device for communicating information to and from an SCSI interface bus. More particularly, the present invention relates to a signal assertion edge triggered filter used in a digital communication system which transmits and receives binary NRZ data over a terminated transmission line.

BACKGROUND OF THE INVENTION

SCSI is a common acronym which stands for Small Computer Systems Interface. SCSI can trace its beginnings back to approximately 1979 in response to the computer industry's desire to develop a disk drive interface that supported logical addressing of data rather than the current industry standard physical addressing. Over the years, the SCSI interface has evolved, adapting and expanding in order to accommodate more functions and features than originally envisaged. These extensions, enhancements and functional improvements are presently embodied in an official ANSI standard termed SCSI-2. The Small Computer System Interface-2 (SCSI-2) standard is defined in ANSI document no. X3.131-1994, the entire contents of which are expressly incorporated herein by reference.

The SCSI-2 interface standard defines a device independent I/O bus which allows a variety of peripheral devices to be coupled to a host computer system over a single communication bus. Up to 8 peripheral devices can be addressed using the SCSI interface bus. These devices function as either an "initiator", a device that begins a transaction by giving another device a particular task to perform, or a "target", the device that carries out the task. A typical bus configuration may comprise any combination of targets in initiators, but it is worth noting that some devices are able to play the role of both target and initiator. However, communication is only allowed between two devices at any given time.

A typical computer system is coupled to the SCSI bus through an apparatus termed a "host adapter". For peripheral devices, the corresponding coupling apparatus is a "controller". Both controllers and host adapters are able to be implemented either as a separate printed circuit-type board or integrated into the peripheral device or host computer system. Host adapters commonly reside directly on the motherboard of workstations and modern personal computers, in which case they are referred to as "embedded host adapters" while personal computers and compatibles us an insertable printed circuit board-type variation. SCSI controllers are commonly incorporated in the drive electronics of modern disk, tape or CD-ROM drives.

Regarding the bus itself, the SCSI bus may be from 8 to 32 bits wide, depending on the buses configuration. Initiator and target devices are daisy-chained together with a simple 50-conductor ribbon cable which permits 8-bit wide (byte wide) information transfers, including all other necessary status and control signals. 16- and 32-bit bus variations are termed Wide SCSI and require an additional 68-conductor ribbon cable which allows 2- or 4-byte wide data transfers. In other words, assuming the same clock frequency, the bandwidth of 32-bit Wide SCSI is 4 times that of 8-bit SCSI.

The SCSI cables (the 50-conductor or A cable and 68-conductor or B cable) are daisy-chained from device to device and are permitted to reach a maximum of 6-meters in length. A small "stub cable" of up to 0.10 meters can be used to connect a peripheral device to the main cable. Since most SCSI devices have only a single SCSI connection point, multiple devices are coupled to the bus by using a single cable which has the appropriate number of connectors (or stub cables) crimped along its length at intervals of at least approximately 0.3 meters apart.

Figure 1:
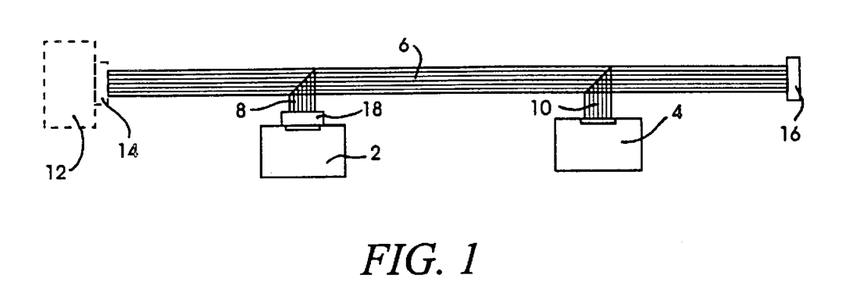
FIG. 1 is a simplified semi-schematic block diagram of a common SCSI system configuration including SCSI devices coupled to an SCSI cable.

A common implementation of multiple SCSI devices coupled together by SCSI cabling is depicted in FIG. 1. In particular, two SCSI devices 2 and 4 are connected to an SCSI cable 6 by respective stub cables 8 and 10. For purposes of simplicity and clarity, the SCSI cable 6 is represented as a single flat ribbon cable such as an exemplary 50-conductor A cable. It will nevertheless be understood by those having skill in the art that the A cable is easily and conventionally combined with a 68-conductor B cable in order to accommodate 16 or 32-bit data buses. An additional device 12 is indicted in phantom in FIG. 1 and represents an optional placement of a device along the length of the SCSI cable 6. The optional placement of various devices along the length of the cable is an important consideration when it is recognized that, according to the SCSI standard, each end of the physical SCSI bus (the cable) must be terminated in order to ensure proper operation of the bus.

In FIG. 1, terminators 14 and 16 are provided at each end of the SCSI cable 6 and function in a manner to be described further below. If, for example, the optional device 12 is not present and the SCSI cable 6 was terminated at its connection to the first SCSI device 2, a terminator 18 is interposed between the stub cable 8 and the device in order to satisfy the bus termination requirement.

Cable termination and the presence or absence of stub cables, daisy-chain connectors, and the like along the SCSI cable are important artifacts to an understanding of the source of various "glitch" reflections and other signal abnormalities that are observed in SCSI systems. In addition to the physical cable configuration and termination requirements, an additional feature of the SCSI bus, pertinent to an understanding of the present invention, is the configuration of SCSI signal drivers, the voltage levels of the various signals and the physical capabilities of an output driver to drive a signal to the requisite voltage levels.

Figure 2:
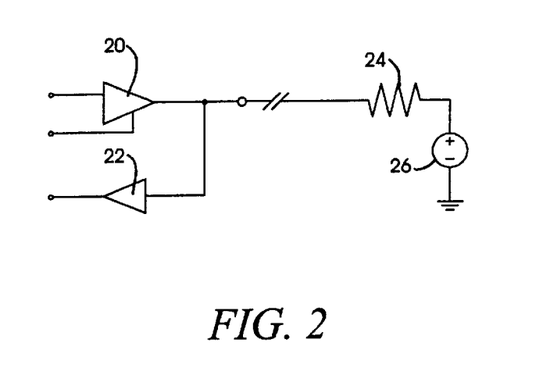
FIG. 2 is a simplified semi-schematic circuit diagram of a common single-ended SCSI signal including an I/O buffer and signal termination.

FIG. 2 depicts a common implementation of a conventional single-ended SCSI signal and suitably comprises a tristate output buffer 20, illustrated in the exemplary embodiment as a tri-state driver circuit 21 driving a terminated signal line. One of the inputs, the signal input, is for receiving digital signal information which is to be provided to the bus, while the other input receives a signal for enabling transfer of digital signal information to the bus. An input buffer 22 is configured to receive digital signal information from the bus and buffer those signals to appropriate voltage levels for use by subsequent circuitry.

In accordance with the SCSI specification, the output driver must be capable of sinking approximately 48 mA at 0.5 V, of which 44 mA comes from the termination (as will be described in greater detail below. The input buffer must be able to recognize 0.0 to 0.8 V as an active signal and 2.5 to 5.25 V as inactive. The input current from an active signal of 0.5 V should be between 0.0 and −0.4 mA and for an inactive signal the current must be between 0.0 and 0.1 mA at 5.25 V.

As was described above, peripheral devices at the extreme ends of each SCSI cable, or the end of each SCSI cable itself, must have a terminator installed or enabled. The SCSI bus defines a terminated transmission line and, therefore, must be properly terminated at both ends so that commands and data can be effectively transmitted to and from all peripheral devices on the bus. Termination is typically enabled by default on SCSI host adapters, but with many SCSI devices, one must manually insert or remove the terminators. More contemporary SCSI devices have built-in terminators that are enabled or disabled by means of switches or software commands. A simplified representation of an early passive termination scheme, as introduced in SCSI-1 is depicted in FIG. 2 and comprises a 110 Ohm resistor 24 coupled to ground potential through a series-connected 2.5 volt voltage source 26. In combination, the resistor 24 and voltage source 26 condition the signal level to approximately 2.5 volts. When neither the tristate driver 20 nor the input buffer 22 is active. Such a terminator scheme is appropriately configured for each signal (signal line) of the SCSI bus. Thus, it will be understood that each end of the physical SCSI bus must be terminated with appropriate terminators in order to function correctly as a terminated transmission line.

Figure 3:
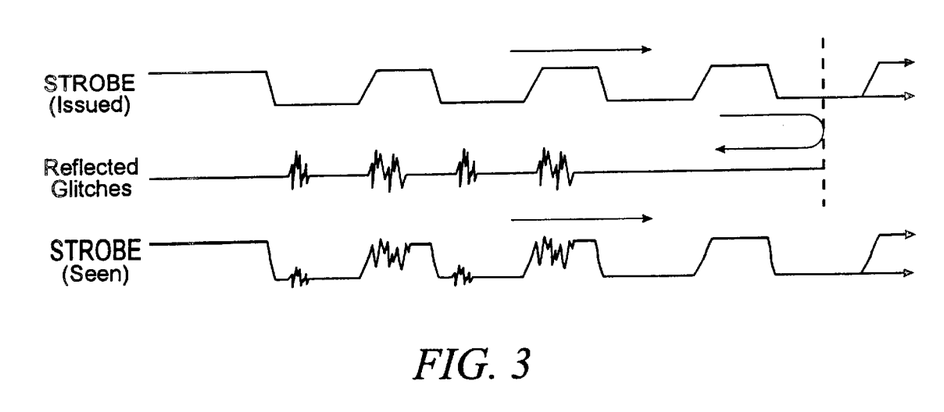
FIG. 3 is a simplified timing diagram of an SCSI strobe signal and glitches reflected from an impedance discontinuity combining to cause the strobe signal's rising transition edge to become non-monotonic.

Turning now to FIG. 3, when digital signal information is transmitted over the SCSI bus cable (a terminated transmission line) in an unencoded, base-band non-return-to-zero format, signal reflections tend to be developed off every voltage transition of the signal. Signal reflection is produced from every impedance discontinuity within the transmission line system, particularly those impedance discontinuities developed by each open ended stub by which devices are connected to the bus cable and the termination devices disposed at each end of the bus cable. For each voltage transition comprising a signal, a pulse of opposite voltage polarity is reflected from each impedance continuity with an amplitude proportional to the ratio of the mismatching impedance and exhibiting a time delay representing the round-trip distance between the output driver asserting the transition and the location of the impedance discontinuity. In many cases, the particular time delay associated with a reflection and the amplitude of such reflections is such that it can cause a signal "glitch" that is easily misinterpreted as a legitimate signal transition. Glitch induced false transitions can easily violate the SCSI signal protocol and cause the system to be susceptible to intermittent hanging or to otherwise malfunction.

Common instances of intermittent hanging on an SCSI bus are caused by "phantom" REQ/ACK pulses, in turn generated by signal reflection off neighboring stub connectors and bus terminators. This is an important consideration because the REQ/ACK handshaking convention controls data transmission between SCSI target and initiated devices. Moreover, REQ/ACK pulses are the only signals comprising the SCSI protocol where the transition edges define the important component of the signal, as opposed to signal level. Pertinent to the operation of the SCSI protocol is the understanding that there are various periodicity and delay timing values required by the system. For example, there is a minimum time value (the assertion period) that REQ and ACK must be active for synchronous transfers as well as a programmable minimum time value (transfer period) between two REQ or ACK pulses, again for synchronous transfers. Thus, there is a particular time period which may be identified between successive valid transition edges of either an REQ or ACK signal.

Given the well defined timing window between successive transition edges of REQ/ACK the prior art has attempted to minimize the effects of spurious transitions caused by signal glitches, by filtering the REQ/ACK signal. Such a filter has been a requirement for SCSI standard compatible devices and is suitably described in the American National Standard X3.253-1995, "SCSI-3 Parallel Interface" specification. Ideally, the filter is devised such that when the assertion edge of an ACK signal is detected, a time delay is invoked and an SCSI device will ignore any other transition on that signal line until the end of the delay period. The filter delay times out just prior to the time in which the next expected transition edge will arrive.

As mentioned above, such a filter has been a requirement for SCSI standard compatible devices, but is unable to effectively deal completely with the effects of reflection induced glitches. In particular, the SCSI standard is not able to specify complete system configurations, including devices, cables, terminators, cabinet shielding, and the various other factors which effect transmission line performance in a closed form. Accordingly, a system configuration could always be created that might not be illegal, as regards the specification, but would nevertheless produce an uncontrollable and unacceptable amount of signal reflection. Such systems would often exhibit behavioral instability and fail to operate in a desirable, robust manner.

Specifically, the time delay and pulse width characteristics of a voltage transition reflection is a function of the physical configuration of the transmission line system, i.e., the distance to neighboring devices, the length or material of the cable, and the like. Reflection characteristics are generally recognized as not correlating to the rate at which data is being transferred along the transmission line. Accordingly, as the data transfer rate on the bus increases, reflection induced glitches are shifted to the extent that they are able to encroach into the next sequential (and later) transfer cycle. This particular problem becomes amplified in single-ended SCSI systems (where an output driver drives a unitary signal line and the return path is provided by common ground lines) as opposed to a differential system (where an output driver drives two wires configured as a twisted-pair, with each wire carrying a signal of exactly opposite polarity from the other). In single ended systems, the output driver characteristics specified in the standard are such that the amount of current the driver sources is unequal to the amount of current that it sinks. In addition, the terminators on the extreme ends of the cable are required to bias the system such that the natural state of the bus is at the signal negation level, i.e., the terminators bring the signal level to about 2.5 V when no drivers are active. Thus, the rising and falling transition edges of a signal pulse will have different slopes and, because of the pull-up action of the termination scheme, the rising transition edge is much more susceptible to reflection induced interference.

Reflection induced glitches cause the rising transition edge to become non-monotonic, as can be seen in FIG. 3. Reflection induced glitches have the effect of causing a rising transition edge to become decomposed into a plurality of oscillatory peaks and valleys, any one of which might be mistakenly identified as a rising transition edge or a falling transition edge depending on the glitch slope and the excursion value.

In view of the foregoing, it would be desirable to provide an effective filter that overcomes difficulty of accurately detecting a rising transition edge in a single ended system when voltage transition reflection is a significant enough problem that the rising transition edge slope is no longer monotonic. It is further desirably that the time duration of operation of such a filter, i.e., the time interval in which the receiving system ignores transition edges on the signal line, is as long as possible without masking out the assertion edge (the falling edge) of a REQ/ACK strobe signal.

It would also be desirable that such a filter be able to operate in a manner such that it detects the REQ/ACK assertion edge to latch in the contents of the data bus and then set a flag which instructs the system to ignore further transitions for approximately an entire transfer period. Once this flag is set, the receiving system should ignore the REQ/ACK strobe signal, including the negation or rising transition edge. The system should recognize the beginning of the next transfer cycle at which time the flag is cleared and the system is ready to receive the next assertion edge to latch in the contents of the data bus.

SUMMARY OF THE INVENTION

One of the objects of the present invention is to provide a timed glitch filter that operates to detect a valid REQ/ACK assertion edge and, in response thereto, latch in the contents of a data bus. The timed glitch filter sets a flag in response to a valid REQ/ACK assertion edge, which disables the latch strobe for approximately an entire transfer period. The flag is cleared just prior to the beginning of the next transfer cycle, at which time the system is armed and ready to latch in the next data byte upon receipt of the next valid strobe assertion edge.

In one aspect, the invention comprises an integrated circuit which is configured to be connected to an SCSI bus in order to receive digital data information provided in sequential byte fashion. Sequential data bytes occur within timing windows defined by successive, like-going transition edges of a periodic timing strobe signal. The integrated circuit comprises a digital timing filter which is operatively responsive to the first transition edge of the timing strobe signal and which provides a latch strobe signal to latch data into the integrated circuit. The digital timing filter includes timing circuitry which also operates in response to the first strobe transition edge and which defines a strobe masking period during which any further transitions of the timing strobe signal are masked, or ignored, such that the contents of the data latches are protected.

The digital timing filter includes qualification circuitry which qualifies a first transition edge of the timing strobe signal as a valid transition edge and, in response thereto, initiates a masking signal which defines the start of the strobe masking period. The qualification circuitry includes a D flip-flop which is strobed by the timing strobe signal. The D flip-flop has a D input connected to receive the strobe mask signal and a Q output connected to an inverting, programmable delay line. The qualification circuit further includes a three-input AND gate, configured to logically "and" the timing strobe signal, the strobe mask signal and the inverted, delayed Q output of the D flip-flop. The AND gate armed by the strobe mask signal and the inverted, delayed Q output of the D flip-flop to provide a low-going latch strobe for the integrated circuit's data latches upon each low-going transition edge of the timing strobe signal.

The AND gate is prevented from transitioning by maintaining its output in the low state for a particular period of time, defined by the frequency of a periodic sampling clock signal. The sampling clock signal propagates the Q output of the D flip-flop through four series-connected flip-flops and, finally, to the "set" input of an SR latch. The frequency of the sampling clock is defined as just greater than four times the frequency of the timing strobe, such that the Q output of the D flip-flop of the qualification circuit "sets" the SR latch just prior to the arrival of the next anticipated assertion edge of the timing strobe. Setting the SR latch functions to arm the AND gate, such that the next low-going assertion edge of the timing strobe causes the AND gate to again assert a low-going latch strobe signal in order to latch the next data byte into the data latches.

An additional feature of the present invention is that the cycle or propagation time of the strobe masking signal through the series-connected flip-flops and, thus, the resolution of a strobe masking period, is adjustable by increasing or decreasing the length of the flip-flop series and correspondingly adjusting the frequency of the sample clock.

An additional significant feature of the digital timing filter in accordance with the present invention is that the data latches are controlled by a strobe input signal gated with a strobe masking signal and the inverted and delayed Q output of a D flip-flop. Once a valid strobe assertion edge is detected, it is used immediately to latch data bus signals into the integrated circuit's data latches. Following a defined delay period through a delay stage, the data latch strobe is masked from any further transition until the strobe mask signal is again affirmatively asserted. The masking period is initially defined by receipt of a valid assertion edge of the timing strobe signal and maintained for a first period by a first portion of a timing circuit suitably comprising two series-connected flip-flops. At the end of the first period, the strobe mask signal is provided to a sink strobe circuit, which synchronously clocks data out of the data latches to thereby provide synchronized data to any follow-on synchronous logic circuits.

BRIEF DESCRIPTION OF THE DRAWINGS

These and other features, aspects and advantages of the present invention will be more fully understood when considered with respect to the following detailed description, claims and accompanying drawings, wherein:

DETAILED DESCRIPTION OF THE INVENTION

In order to provide a more complete understanding of the construction and operation of the present invention, it will be necessary to give some background information regarding the conventional operation of data transfer transactions on the SCSI bus, particularly as regards synchronous and asynchronous transfer operations and the request/acknowledge (REQ/ACK) handshake convention or sequence used for command, data and status information transfer.

Conventionally, following arbitration and a target selection phase, the selected SCSI target device is in control of the SCSI bus. After any required MESSAGE and COMMAND phases, the SCSI target initiates a data transfer phase by configuring certain bus control signals in accordance with established SCSI protocols. At this point, either synchronous or asynchronous information transfers may take place. Whether information transfer is synchronous or asynchronous depends on if the target and initiator device negotiated to use synchronous data transfer during the previous MESSAGE phase. An SCSI device that desires to transfer data synchronously, will send a "Synchronous Data Transfer Request" to the other device as an extended message, which includes the desired transfer period and the desired REQ/ACK offset. It should be noted, however, that synchronous information transfers pertain only to the DATA phases. Command, message and status information is transferred asynchronously The particular embodiment of an I/O cell having a signal assertion edge triggered glitch filter, in accordance with the present invention, is particularly advantageous when used in connection with synchronous data transfers, because of the generally shorter transfer period associated with such transfers. However, the embodiment of the invention is quite suitable for use in connection with asynchronous transfers, as will become apparent to those having skill in the art. Accordingly, it will be useful to provide a description of SCSI bus operation with regard to first, asynchronous and next, synchronous information transfers.

Figure 4A:
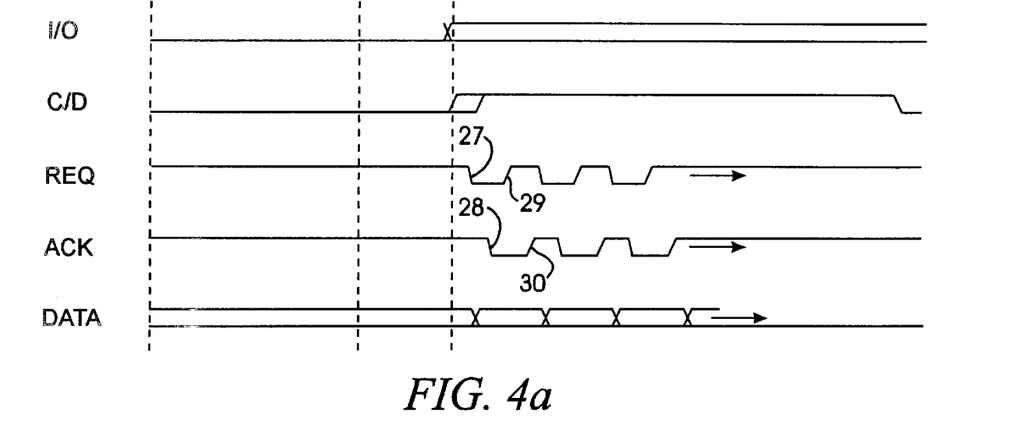
FIG. 4a is a simplified timing diagram of an SCSI protocol including a REQ/ACK asynchronous data transfer sequence.

FIG. 4a is a simplified timing diagram of an asynchronous data transfer in accordance with a typical REQ/ACK sequence, with the BSY, SEL, ATN and MSG signals omitted for purposes of simplicity. As is well understood, an SCSI target device determines the direction of any particular data transfer by adaptively controlling the logical state of an I/O (In or Out) signal line. In the illustration of FIG. 4a, I/O is depicted as de-asserted (in the inactive high state), indicating that the target device is to receive data from an initiator and that the data phase is thus, defined as a DATA OUT phase (determined with respect to the initiator). Asynchronous transfer of any particular data byte is characterized by the target device asserting the REQ signal by dragging it down from its nominal inactive high level to an active low, as indicated in FIG. 4a, by the first REQ assertion edge at 27. In response, the initiator places a byte of digital information onto the data bus and, following the appropriate deskew delays, the initiator asserts the ACK, signal indicated, in FIG. 4a, by the first ACK assertion edge 28. In a manner to be described further below, the target then reads the information byte and releases REQ 29. Finally, the initiator releases ACK 30, and may now remove the data byte from the data bus, thus completing the information transfer. Further digital information bytes are transferred between the initiator and target device in subsequent REQ/ACK sequences until all information is transferred. The sequence proceeds as described whether the information being transferred is command, message, data or status information.

When a target device desires to affect a data transfer synchronously, synchronous data transfer must first be established by a "Synchronous Data Transfer Request" in the message phase, as was described above. When using synchronous data transfer, a target is allowed to send a particular maximum number of REQ pulses to the initiator, without waiting for an acknowledging ACK pulse. The REQ pulses are provided at a fixed period, termed the synchronous transfer period, which was established by negotiation between the target and initiator within a Synchronous Data Transfer Request. The maximum number of REQ pulses that the target device may send to the initiator without receiving an ACK is termed the REQ/ACK offset, which is also established within the Synchronous data transfer request.

Figure 4B:
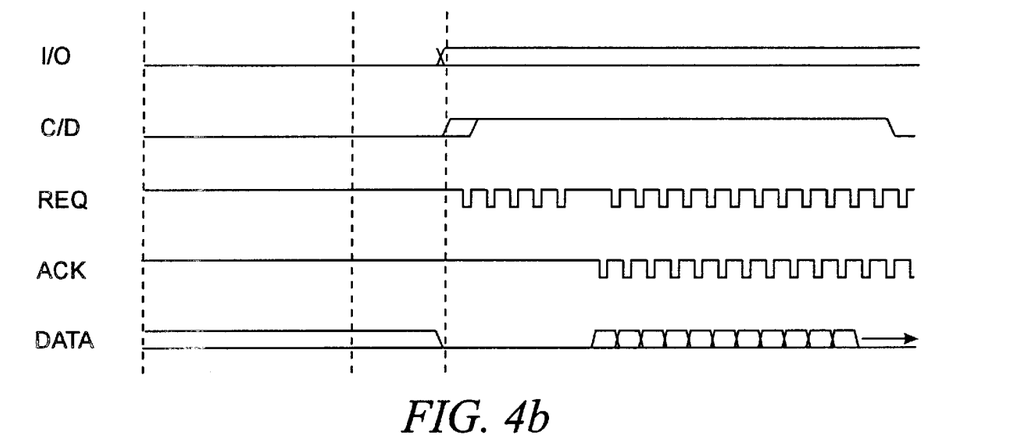
FIG. 4b is a simplified timing diagram of an SCSI protocol for a synchronous data transfer sequence with a REQ/ACK offset of five.

FIG. 4b is a simplified timing diagram of a synchronous data transfer in which the REQ/ACK offset is set to five. As was the case with FIG. 4a, the BSY, SEL, ATN and MSG signals are omitted for purposes of simplicity and clarity. As illustrated in the timing diagram of FIG. 4b, the target device issues five REQ pulses at a fixed frequency determined by the synchronous transfer period. The target device must then idle, since the REQ/ACK offset maximum of five outstanding ACK pulses has been reached.

In response, the initiator begins synchronous data transfer by placing a data byte on the bus and strobing it with an ACK pulse, followed by a next data byte strobed by a next ACK pulse, a third data byte strobed by a third ACK pulse, and so on at the same fixed frequency determined by the synchronous transfer period. With the arrival of the first ACK pulse, the number of outstanding REQ pulses has dropped below the offset maximum of five, and the target response by issuing REQ pulses continually at the defined frequency. In this manner, synchronous data transfer proceeds with maximum efficiency.

At the first assertion edge 28 of ACK following the target device's assertion of REQ 27, the falling transition of the ACK signal functions to latch the contents of the data bus into the I/O circuitry of the target device. It is generally understood that single-ended bus driver systems comprise an output driver that is able to drive a low-going transition edge at a higher current than a high-going transition edge. The low going transition edge is thus sharper and more easily defined and, accordingly, is more readily detectable on a consistent basis compared to a rising transition edge.

Figure 4C:
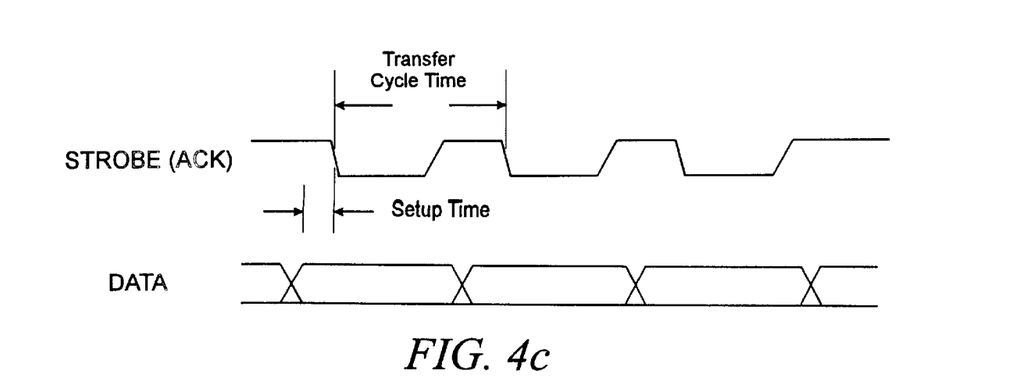
FIG. 4c is a close-up view of the ACK/DATA timing sequence, indicating the timing relationship between the strobe assertion edge and a valid data signal.

Turning now to FIG. 4c, which is a close-up illustration of a portion of the SCSI protocol timing diagrams of FIGS. 4a and 4b, there is shown the timing relationship between the rising and falling edges of ACK and a valid data signal on the SCSI bus, in the context of a DATA OUT transfer from initiator to target. As depicted in FIG. 4c, a data byte is placed on the bus by the initiator following which the initiator asserts ACK. The timing period between the appearance of data on the bus and the assertion of ACK is termed the set up time and is required to account for various protocol deskew delays and the time required for the data signal to be properly set up on the data inputs of the target device input latches. As depicted in the timing diagram of FIG. 4c, the time period between assertion edges of ACK, i.e., the bus rate, is termed the transfer cycle time and refers to the time period defining successive valid data events on the bus. It will be understood by those having skill in the art that input circuitry need only be concerned with latching in data at the end points of the transfer cycle time, i.e., only at the assertion edge of ACK. Once the data is latched in, there is no longer a need to evaluate the assertion or non-assertion state of ACK until the next data set appears on the bus, the set up time has past, and the transfer cycle time has ended, i.e., at the next assertion edge of ACK.

In accordance with the practice of principles of the invention, an assertion edge triggered glitch filter first detects this assertion edge in order to capture the contents of the data bus in a set of input latches comprising an I/O cell. The glitch filter according to the invention next sets a flag which instructs the filter to ignore any further edge transitions for a programmable time period spanning almost an entire transfer period. Once this flag is set, the I/O circuitry of the data receiving system (the target system) ignores the strobe signal (ACK) including the negation, or rising, edge. Just prior to the beginning of the next transfer cycle, the filter according to the invention clears the flag, thus conditioning the I/O circuitry to receive the next assertion edge and latch in the next data set from the data bus.

Figure 5:
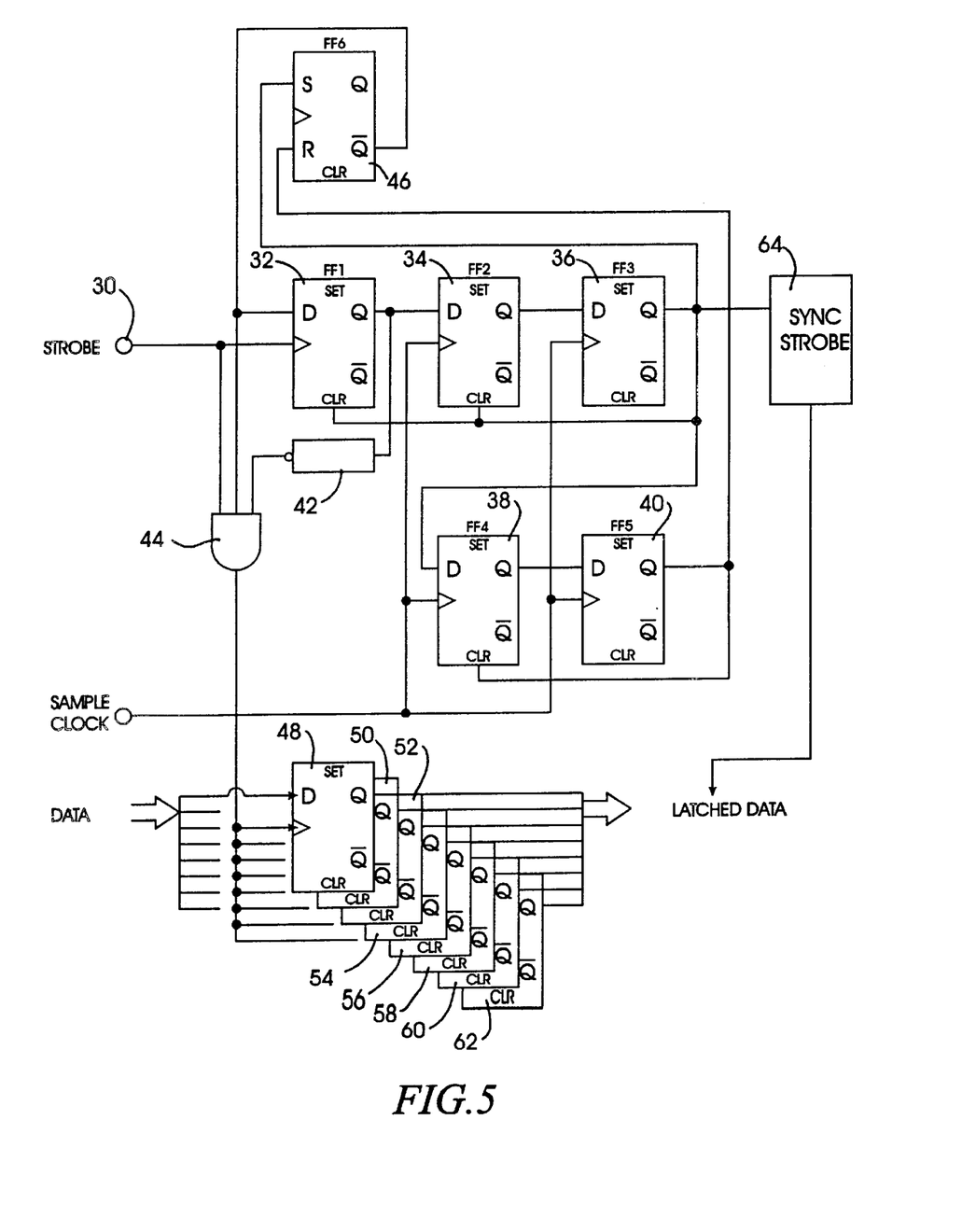
FIG. 5 is a logic diagram of an SCSI input latch array controlled by a signal assertion edge triggered glitch filter in accordance with the practice of principles of the present invention.

The construction and operation of the assertion edge triggered filter, in accordance with the present invention, can best be understood with reference to the logic diagram of FIG. 5. In FIG. 5, a signal input 30 is configured to receive a strobe signal, such as ACK, from the SCSI signal bus. In the illustrated embodiment, a string of conventional D flip-flops, FF1 (32), FF2 (34), FF3 (36), FF4 (38) and FF5 (40) are connected in series with each having a D(data) input connected to the non-inverting Q output of the preceding flip-flop of the series. The strobe, or clock, input of the first flip-flop of the series, FF1 (32) is connected to the strobe signal input 30, while the clock inputs of the remaining flip-flops of the series FF2 through FF5 (34, 36, 38 and 40) are connected to a sampling clock input which is, in turn, coupled to an external reference clock generating circuit such as a controlled crystal oscillator. The output of the first flip-flop of the series 32, in addition to being coupled to the D input of the next succeeding flip-flop, is also connected to a delay stage 42 which functions to provide a programmably delayed and inverted signal (representing the output of the first flip-flop 32) to an input of a three input AND gate 44. A second input to the AND gate 44 is connected to the D input of the first flip-flop 32, in turn connected to the inverting $\overline{Q}$ output of an SR latch 46. The function of the SR latch 46 and the $\overline{Q}$ output, denoted herein STROBE ENABLE will be described in greater detail below.

The third input of the three input AND gate 44 is connected to the strobe signal input 30, in turn, connected to the clock input of the first flip-flop 32 of the series.

As is evident to one having skill in the art of logic circuit design, AND gate 44 conventionally operates to output a logical zero signal for any combination of logic levels at the three inputs, except all logic "ONES". In such condition, with all of the inputs at a logic ONE state, AND gate 44 will output a logic ONE in response.

The output of AND gate 44 is connected to the strobe or clock input of a set of 8, parallel coupled D flip-flops, denoted 48, 50, 52, 54, 56, 58, 60 and 62, whose D or data inputs are connected to receive data signals from the data bus portion of the SCSI interface. Eight D flip-flops are depicted in the illustrated embodiment, and represent the input latches of a I/O cell configured to receive data from an 8-bit wide data bus. Although only 8 input latches are depicted, it will be evident to one having skill in the art that the circuit may be easily expanded to accommodate at 16-bit wide bus, or a 32-bit wide bus by merely replicating the number of input latches comprising the I/O cell. In conventional fashion, each D flip-flop operates normally by latching the logical value on the D input to the Q output on each positive-to-negative going transition edge of a strobe or clock signal. Since each D input of the latch set 48–62 is at a logic level corresponding to a particular data bit comprising the data bus, a negative-going transition, received from AND gate 44, latches the data through the flip-flops 48–62 and makes it available at the latch sets Q output.

For exemplary purposes, it will be assumed that the strobe enable signal (the $\overline{Q}$ output of SR latch 46), the inverted output signal from the delay stage 42 and the strobe input 30 (ACK) are all initially in a logical high state. The output of AND gate 44 is therefore also at a logical high as are the strobe signals to the data latches 48–62. As the strobe signal ACK is asserted, i.e., on the next falling edge, the output of AND gate 44 transitions from a logical high to a logical low, thus latching the contents of the data bus to the Q outputs of the data latches 48–62. At the same time, the strobe falling edge activates the first flip-flop 32 of the series, thereby latching the logic high on the D input to the Q output. The logic high of the output of FF1 32 is delayed by the delay stage 42, inverted and directed to an input of the AND gate 44 as a logic low signal. Accordingly, the data latch strobe signal developed by AND gate 44 becomes dormant (remains at a logic low) after a built-in delay developed through the FF1 output upon strobe (ACK) assertion and remains so until STROBE ENABLE is again asserted, in a manner to be described in greater detail below. Accordingly, even if the strobe (ACK) input is infested with reflection induced transients, as depicted in FIG. 3, AND gate 44 will remain in the low state thus protecting the contents of the data latches 48–62 from transient switching.

It will be thus seen that flip-flop FF1 32, in combination with delay stage 42 and AND gate 44 function to qualify the first negative-going transition of an input strobe signal as a valid transition edge and initiate a glitch masking signal which masks any further transitions of the input strobe signal, such that the contents of the data latches are protected.

The logical high at the Q output of FF1 32 is directed to the D input of the second flip-flop 32 of the series where it is latched to the non-inverting Q output upon a valid transition edge of the sampling clock signal. For reasons that will be developed in greater detail below, the sampling clock, or reference clock, is developed by an external control crystal oscillator circuit and operates at any one of a plurality of pre-determined frequencies. For purposes of illustration, on a 20 MHz SCSI bus system (edge-to-edge interval of about 50 nsec), the sampling or reference clock may have an operating frequency of about 80 MHz (12.5 nsec period). Operating the sampling reference clock at such a frequency functions to develop a glitch masking signal (flag length) in 12.5 nsec intervals. Thus, the length of the glitch mask can be 12.5 nsec, 25 nsec, 37.5 nsec or 50 nsec. In order that the glitch mask clear before the next expected assertion edge of the strobe input signal, it will be evident that the sampling or reference clock frequency should be somewhat in excess of the exemplary 80 MHz frequency, as will be developed further below.

The logic high signal on the Q output of FF2 34 is directed to the D input of the next flip-flop 36 in the series, whence it is latched to its non-inverting Q output at the next valid transition edge of the sampling or reference clock signal. As the Q output of FF3 36 goes high, the Q output is directed to the input of a SYNCH STROBE circuit 64. As the input of the synch strobe 64 goes high, this informs the circuit 64 that valid data has been latched to the Q outputs of the data latches 48–62. In response, the synch strobe circuit 64 accesses the data latches to thereby provide synchronized data to any follow-on synchronous logic circuits. Thus, FF2 and FF3 in combination with the sampling or reference clock function to synchronize the strobe input signal's assertion edge and, thus, data transfer from the generally asynchronous SCSI bus to subsequent synchronous processing logic.

The Q output of FF3 36 is also used to perform two additional functions besides providing a synchronization signal to the strobe circuit 64. The Q output of FF3 is connected to the clear (CLR) input of FF1 and FF2 such that as it transitions high, it clears FF1 and FF2 so that the synchronizer chain FF1–FF3 is armed to receive a next assertion edge transition of the strobe signal. At the assertion of the Q output of flip-flop 36, both FF1 and FF2 are immediately cleared. As will be evident to one having skill in the art, FF3 will be cleared at the next valid transition edge of the sampling or reference clock. The Q output of flip-flop 36 is also connected to the "set" input of the SR latch 46, such that as the Q output of flip-flop 36 goes high, it clears the STROBE ENABLE signal of the SR latch 46, thus preventing FF1 from being set.

It should be noted, here, that as FF1 is cleared, the signal through the delay stage 42 is inverted and provided to an input of the AND gate 44 as a logic high. Clearing the strobe enable signal (the $\overline{Q}$ output of SR latch 46) puts a logic low on a corresponding input of AND gate 44, thus ensuring that the AND gate output remains low and the contents of the data latches 48–62 are undisturbed.

The glitch masking period is extended by further coupling the Q output of flip-flop 36 to two additional series-coupled flip-flops FF4 and FF5 (38 and 40). As FF3's Q output goes high, it is further coupled to the D input of FF4 which is, in turn, latched to the non-inverting Q output at the next valid transition edge of the sampling reference clock signal. The next valid transition edge of the sampling or reference clock signal latches the signal to the non-inverting Q output of the final flip-flop 40 in the series. As the Q output of flip-flop 40 transitions high, it clears the preceding flip-flop 38 and, in addition, "resets" the SR latch 46 such that its inverting $\overline{Q}$ output is driven to a logic high state. At this fourth and final sampling or reference clock transition, it will be seen that AND gate 44 will have two inputs set to a logic high state; the logic low from the Q output of cleared flip-flop 32 past through delay stage 42 and inverted, and the logic low $\overline{Q}$ output of SR latch 46. The third input of AND gate 44 is the strobe input 30, desirably at a logic high as well.

From the foregoing, it will be evident that the transfer cycle time between strobe assertion edges, in the exemplary embodiment, is about four sample or reference clock cycles; three of which are comprised by the combined maximum latencies of the synchronization flip-flops 32, 34 and 36, and one additional sampling or reference clock cycles comprising the strobe masking extension flip-flops 38 and 40. While the first flip-flop 32 of the series is not controlled by the sampling or reference clock signal, it will nevertheless be evident that an additional clock latency period should be added to account for FF1 in synchronizer string. This logically follows when it is realized that a valid strobe (ACK) assertion edge might be received by FF1 at the same time as a sampling or reference clock assertion edge is received by FF2. Thus, an entire sampling or reference clock latency period must elapse before the new output state of the Q output of flip-flop 32 may be latched through to the Q output of flip-flop 34. Since the maximum latency period of the filter in accordance with the invention is approximately five sampling or reference clock cycles, and since the nominal transfer cycle time between valid strobe assertion edges is approximately 50 nsec, it should be evident that each sampling or reference clock cycle should have a periodicity about ⅕ that of the bus rate. Thus, for a 20 MHz bus, the sampling or reference clock frequency should be somewhat in excess of 100 MHz (somewhat less than 10.0 nsec per period). It should be noted, however, that the sampling or reference clock frequency or cycle time can be easily modified to best fit a particular given application. In addition, the overall cycle time of the filter can be modified by merely adjusting the number of storage elements (flip-flops) in either the synchronizer section or the strobe masking extension section, or both. If a finer degree of resolution is required, such as in an 80 MHz bus system (SCSI-FAST 80) the sampling or reference clock might be driven at 800 MHz and the filter constructed with up to 10 flip-flop elements appropriately subdivided between the synchronizer and strobe masking extension sections.

An additional significant feature of the glitch masking filter in accordance with the present invention is that the data latches 48–62 are controlled by the strobe input signal gated with STROBE ENABLE and the inverted and delayed Q output of FF1. Once a valid strobe assertion edge is detected, it is used immediately (with only a gate delay through AND gate 44) to latch the data bus signals to the Q outputs of the data latches 48–62. Following a defined delay period through delay stage 42, the data latch strobe (the output of AND gate 44) is masked from any further transition until STROBE ENABLE is again affirmatively asserted by the SR latch 46. The masking period is initially defined by receipt of a valid assertion edge of the strobe signal and maintained for a first period by the combination of the SR latch 46, FF1 and the delay stage 42. The latch strobe mask is maintained for a second period by a strobe masking extension circuit suitably comprising flip-flops FF4 38 and FF5 40, and which period is determined by a sampling or reference clock frequency which propagates a signal through the flip-flops to thereby cause the SR latch 46 to affirmatively assert STROBE ENABLE just before the expected arrival of a next valid assertion edge of the strobe (ACK) signal.

The invention described provides a glitch filtering system which qualifies a first transition edge type of an input strobe signal as a valid transition edge and further masks the strobe input until such time as a next valid transition edge is expected. In conjunction with the masking function, the glitch filtering system is configured to use a negative-going assertion edge as a latch trigger and mask initiation signal since the negative-going assertion edge is the better defined transition edge of an SCSI bus and comprises the least amount of jitter and non-monotonicity. In accordance with practice of the principles of the invention, the glitch filtering system uses the first valid strobe assertion edge transition to latch in the contents of the data bus and ignores further strobe signal transitions until such time as the next valid assertion edge is expected. Choice of the strobe masking signal duration and the resolution of strobe mask timing is a matter of design choice and can be adjusted by increasing or decreasing the length of the storage element array, the sampling or reference clock frequency, or both, to fit a particular application.

It should be recognized that the embodiment of the invention described is exemplary and that there are numerous ways in which the circuit elements described may be rearranged in order to provide the required functions. For instance, the array of flip-flops could be implemented as a counter in combination with a shift register or some other suitable logical combination without violating the spirit of the invention. Similarly, the delay stage 42 need not comprise an inverting element but might be suitably coupled to the $\overline{Q}$ output of FF1. A person ordinarily skilled in the art of circuit design may easily imagine alternative configurations of circuit elements such that the specific logic levels of the various circuit elements might be inverted. A logic level need not necessarily be "high", so long as subsequent logic circuitry is designed accordingly.

A significant improvement has been brought to the art of digital communication systems which transmit and receive binary data over a terminated transmission line, such as an SCSI bus. Having thus described an embodiment of the invention, it will now be appreciated that the objects of the invention have been fully achieved and that differing embodiments and applications in the invention will suggest themselves without departure from the spirit and scope of the invention.

What is claimed is:

1. In an integrated circuit, configured for connection to an SCSI bus, whereon digital data information is transferred between initiator and target SCSI devices in accord with a data transfer protocol over terminated transmission lines, digital data information being received by the integrated circuit over a data bus portion in sequential byte fashion, each byte occurring within sequential, equally spaced-apart timing windows defined by successive, like-going transition edges of a timing strobe signal, the integrated circuit comprising:

a strobe input, connected to receive the timing strobe signal, the timing strobe signal defining a first transition edge and a second, opposite-going transition edge;

a plurality of data inputs connected to receive digital data information from the data bus portion, the data inputs further connected to respective ones of a corresponding plurality of data latches; and a digital timing filter, operatively responsive to the first transition edge of the timing strobe signal, the digital timing filter providing a latch strobe signal to the data latches whereby digital data is latched into the integrated circuit, the digital timing filter including timing circuitry operatively responsive to the first transition edge of the timing strobe signal for defining a strobe masking period during which any further transitions of the timing strobe signal are masked until the next occurrence of a like-going transition edge, such that the contents of the data latches are protected.

2. The integrated circuit according to claim 1, the digital timing filter further comprising qualification circuitry, connected to the strobe input and operatively responsive to the timing strobe signal for qualifying a first transition edge of an input strobe signal as a valid transition edge and for initiating a masking signal defining the start of the strobe masking period.

3. The integrated circuit according to claim 2, the digital timing filter further comprising a clock input connected to receive a periodic sampling clock signal, the clock signal oscillating at a frequency at least an integral multiple of the timing strobe signal.

4. The integrated circuit according to claim 3, the qualification circuit comprising:

a strobed D flip-flop having a clock input connected to receive the timing strobe signal, a D input connected to receive a strobe mask signal and an output;

a delay line having a programmable delay period, the delay line connected to the output of the strobed D flip-flop; and a logic element configured to receive the timing strobe signal, the strobe mask signal and the delayed output of the strobed D flip-flop, the logic element logically processing the signals so as to provide an assertion signal to the data latches only on the first valid transition edge of the timing strobe signal.

5. The integrated circuit according to claim 4, the timing circuit comprising:

a plurality of series-connected clocked D flip-flops, operatively responsive to the sampling clock signal, the clocked D flip-flops propagating the output signal of the strobed D flip-flop at the sampling clock frequency; and an SR latch connected to the distal end of the series-connected clocked D flip-flops and coupled to receive the propagated output signal at a set input, the SR latch having an output defining the strobe mask signal, the strobe mask signal being driven to an assertion state on arrival of the output signal propagated by the series-connected clocked D flip-flops, said assertion state arming the logic element such that the logic element provides an assertion signal to the data latches on the next valid transition edge of the timing strobe signal so as to latch in the next sequential data byte.

6. The integrated circuit according to claim 5, wherein the plurality of series-connected clocked D flip-flops comprises an equal number of components as the largest integer multiple of the sampling clock frequency compared to the timing strobe frequency.

7. The integrated circuit according to claim 6, wherein the plurality of clocked D flip-flops comprises four series-connected flip-flops, the output of the second flip-flop of the series being further connected to a reset input of the SR latch.

8. The integrated circuit of claim 7, wherein the first valid transition edge of the timing strobe signal is a high-to-low going transition edge.

9. The integrated circuit according to claim 8, wherein the strobe masking period begins at the end of the programmable delay period from assertion of the first valid transition edge, the strobe masking period extending an equal number of sampling clock periods as components that comprise the plurality of clocked D flip-flops.

10. The integrated circuit according to claim 9, wherein the timing window is defined by like-going edges of the timing strobe have a frequency of about 20 megahertz and wherein the sampling clock signal has a frequency of greater than about 80 megahertz.

* * * * *